Feb. 19, 1929.
J. F. BLACK
1,703,073
APPARATUS FOR ANNEALING GLASSWARE
Filed Jan. 16, 1926
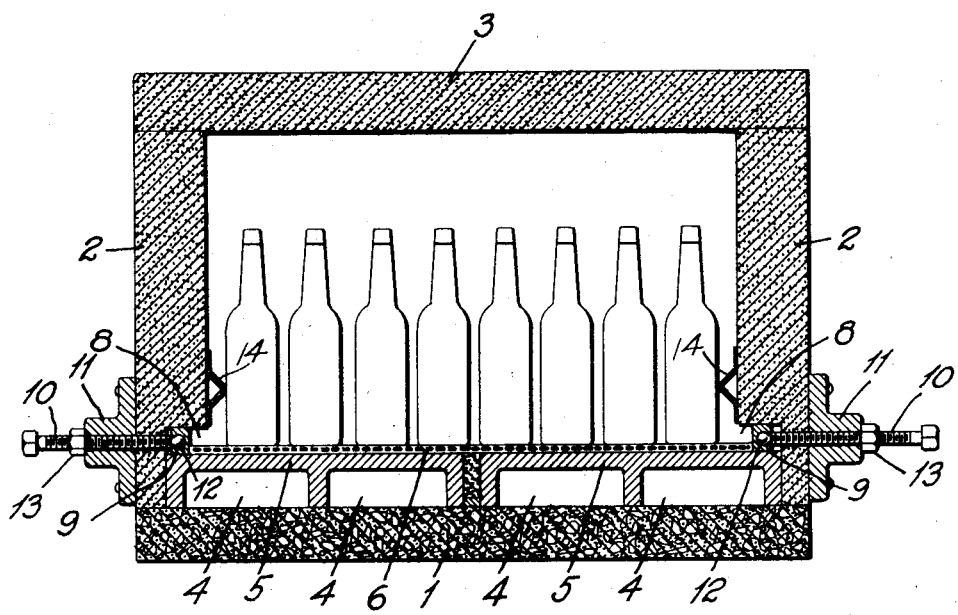
Inventor:
Jotham F. Black
by Robert S. Brown
Atty.

Patented Feb. 19, 1929.

1,703,073

UNITED STATES PATENT OFFICE.

JOTHAM F. BLACK, OF BUTLER, PENNSYLVANIA, ASSIGNOR TO HARTFORD-EMPIRE COMPANY, OF HARTFORD, CONNECTICUT, A CORPORATION OF DELAWARE.

APPARATUS FOR ANNEALING GLASSWARE.

Application filed January 16, 1926. Serial No. 81,706.

The invention relates to apparatus for annealing glassware and it has particular relation to tunnel lehrs embodying a conveyor of flexible woven wire fabric for transporting articles of glassware through a heated environment of decreasing temperature such as the lehr disclosed in U. S. Patent No. 1,560,481, granted November 3, 1925 to Hartford-Empire Company as the assignee of Vergil Mulholland.

In this patent the ware-bearing strand of an endless conveyor of flexible woven wire fabric or mesh is shown as being supported throughout its length and breadth by a flat metallic floor which is heated from beneath. The conveyor, upon becoming heated and being under considerable tension may have a tendency to stretch longitudinally and thereby to decrease in width.

In constructing lehrs of the type described, it is customary to build the side walls of the tunnel rigidly with the floor and to depend upon these walls to function as guides for the conveyor, which is initially the same width as the tunnel. When, however, the conveyor decreases in width upon stretching, a space develops between the edges thereof and the side walls which causes a tendency for the conveyor to move irregularly in its passage through the tunnel, which may displace the ware and cause breakage. In the event that ware becomes broken, the fragments thereof accumulate in the space between the edges of the conveyor and the side walls, thereby impairing the passage of the conveyor through the tunnel and interfering with the operation of the lehr.

One of the objects of the present invention is to avoid the disadvantages above mentioned by equipping the lehr with a conveyor having an initial width greater than that of the tunnel, with the edges of the conveyor extending into longitudinal recesses or channels provided in the side walls, a distance sufficient that, if the conveyor should decrease in width, its lateral dimensions will always be equal to or greater than that of the tunnel when the conveyor has eventually stretched to its limit and become set with a permanent width.

Another object of the invention is to provide laterally adjustable guides in the recesses in the side walls, which are engaged by the edges of the conveyor and by means of which the conveyor may be shifted laterally in order to centralize the conveyor relative to the tunnel upon a decrease in the width thereof occasioned by longitudinal stretching.

Other objects will appear from the following description and the appended claims.

The single figure of the accompanying drawing is a vertical cross-sectional view through a tunnel lehr constructed in accordance with the invention.

Referring to the drawing, the tunnel is shown as comprising a heat-insulated bottom 1, side walls 2 and top 3 and heated by flues 4 consisting of a plurality of inverted metallic channel members 5 which form the floor of the tunnel.

Ware is transported through the tunnel by an endless conveyor 6 of flexible woven wire fabric, the ware bearing strand of which is supported directly throughout its length and breadth by the channel members 5. The conveyor 6 is of a width greater than that of the tunnel and the edges thereof extend into longitudinal recesses 8 provided in the side walls 2 adjacent to the floor of the tunnel.

The conveyor may be shifted laterally to centralize the ware-bearing strand thereof with respect to the tunnel by guides 9 which are disposed in the recesses 8 and which may be adjusted laterally by screws 10. These screws are threaded into brackets 11 carried by the side walls 2 and are provided with heads 12 at their inner extremities for rotatable engagement with sockets provided in the guides 9. The guides may be secured in adjusted position by lock nuts 13 which are threaded upon the screws 10 for engagement with the brackets 11.

The ware is prevented from contacting with the walls 2 of the tunnel during its passage therethrough by longitudinal guides 14 which provide a line contact for the ware.

From the foregoing it will be apparent that as the conveyor decreases in width, the guides 9 may be moved inwardly, that they may always be in operative engagement therewith, and may be adjusted equally so as to centralize the conveyor relative to the tunnel in the event that its width decreases to substantially that of the tunnel.

The illustrated embodiment of the invention may be modified in construction and arrangement without departing from the scope of the invention as set forth in the appended claims.

I claim as my invention:

1. Apparatus for annealing glassware, comprising a tunnel having side walls provided with longitudinally extending grooves, a flexible conveyor for transporting ware through said tunnel and having the edges thereof extending into said grooves, and means for centralizing said conveyor relative to said tunnel upon a decrease in the width thereof occasioned by longitudinal stretching.

2. Apparatus for annealing glassware, comprising a tunnel having side walls provided with longitudinally extending grooves, a flexible conveyor for transporting ware through said tunnel and having the edges thereof extending into said grooves, and means, located in said grooves, for centralizing said conveyor relative to said tunnel.

3. Apparatus for annealing glassware, comprising a tunnel having side walls provided with longitudinally extending grooves, a flexible conveyor for transporting ware through said tunnel and having the edges thereof extending into said grooves, and laterally adjustable guides disposed adjacent to the edges of said conveyor for centralizing said conveyor relative to said tunnel.

4. Apparatus for annealing glassware, comprising a tunnel having a heated floor and side walls having a longitudinal recess provided therein adjacent to said floor, a conveyor of woven wire fabric for transporting glassware through the tunnel and having the edges thereof extending into said recesses, and means disposed adjacent to an edge of said conveyor for shifting said conveyor laterally upon a decrease in the width thereof occasioned by stretching.

5. Apparatus for annealing glassware, comprising a tunnel having a heated floor and side walls each provided with a longitudinally extending recess disposed adjacent to said floor, an endless conveyor of woven wire fabric having its ware bearing strand mounted adjacent to said floor and having the edges thereof extending into said recesses, and laterally adjustable guides mounted in said recesses for centralizing said conveyor relative to the tunnel upon a decrease in the width of said conveyor caused by longitudinal stretching.

Signed at Butler, Pennsylvania, this 9th day of January, 1926.

JOTHAM F. BLACK.